United States Patent Office 3,682,861
Patented Aug. 8, 1972

3,682,861
POLYURETHANE ELASTOMERS AND A PROCESS FOR THE PRODUCTION THEREOF
Eduard Radlmann and Armin Kohler, Dormagen, Klaus Konig, Leverkusen, and Gunther Nischk, Dormagen, Germany, assignors to Farbenfabriken Bayer Aktiengesellschaft, Leverkusen, Germany
No Drawing. Filed Jan. 16, 1970, Ser. No. 3,521
Claims priority, application Germany, Jan. 25, 1969, P 19 03 740.2; Sept. 16, 1969, P 19 46 792.6
Int. Cl. C08g 22/10, 22/14
U.S. Cl. 260—47 CB 10 Claims

ABSTRACT OF THE DISCLOSURE

High molecular weight polyurethane elastomers having high resistance to hydrolysis and withstanding higher thermal stresses, obtained by reacting a dihydroxyl compound with an excess of a diisocyanate, dissolving the adduct thus obtained, reacting this adduct in solution with an excess of a diamine, and finally reacting the polyurethane polyurea with a substantially equivalent amount of a dicarboxylic acid dihalide. The elastomers can be spun to threads and fibers.

---

The invention relates to polyurethane elastomers which are obtained by the reaction of an isocyanate-containing polyurethane adduct with a diamine and by subsequent reaction with a dicarboxylic acid halide.

It is known that polyether, polythioether, polyacetal or polyester isocyanates may be reacted in solvents with chain lengthening agents such as glycols, diamines, hydrazines, hydrazides, amino alcohols or water to produce high molecular weight compounds and that the solution may be worked up so as to produce rubbery elastic products. It is also known that the reaction of the isocyanate-containing polyurethane adducts with the chain lengthening agents may be carried out in a precipitation bath with simultaneous moulding.

It is an object of this invention to provide high molecular weight polyurethane elastomers having the following recurrent structural segment:

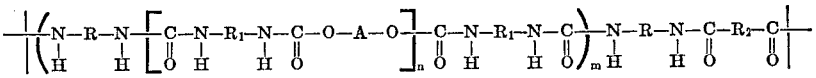

in which
A is a bivalent long chained linear radical which has recurrent ether, acetal, thioether or ester groups and an average molecular weight in the region of from 400 to 4000,
R is a phenylene, diphenylene, or naphthylene group, a radical of the formula

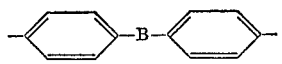

in which B is —O—, —S—, —SO$_2$—, or —CO—, or an alkylene radical or a radical of the formula —Ar—X—Y— in which
Ar is a phenylene, diphenylene or naphthylene radical,
X is a single bond or an ether, carbonyl, amide or urea group, and
Y is a straight chained or branched alkylene radical having from 1 to 20 carbon atoms, R$_1$ is a bivalent alkylene, cyclohexylene, aralkylene, alkarylene, phenylene, diphenylene or naphthylene radical or a radical of the formula

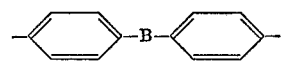

in which B has the meaning indicated above,
R$_2$ is a bivalent aliphatic radical having from 1 to 12 carbon atoms or a bivalent aromatic radical which consists of one or more aromatic nuclei which may be condensed or linked via alkylene, oxygen, sulphonyl or carbonyl bridges, and $n$ and $m$ are integers of 1 or more.

In a preferred embodiment of the invention in which R is the radical —Ar—X—Y, the products obtained are, therefore, polyurethane elastomers which have the recurrent structural element:

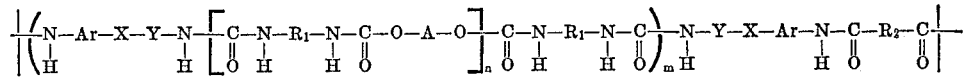

in which
Ar is a phenylene, diphenylene or naphthylene radical,
X is a single bond or an ether, carbonyl, amide or urea group,
Y is a straight chained or branched alkylene radical having from 1 to 20 carbon atoms, and
R$_1$, A and R$_2$ have the meaning indicated above.

It is another object of this invention to provide a process for the production of these rubbery elastic polyurethanes, having excellent technological, textile and reproducible properties which comprises (a) reacting a dihydroxyl compound having a molecular weight in the region of from 400 to 4000 with an excess of a difunctional isocyanate, based on the hydroxyl end groups, said reacting being carried out in the melt at temperatures of up to 150° C.,

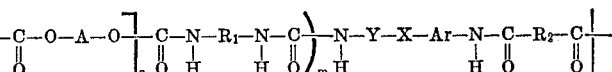

(b) dissolving the resulting adduct which has isocyanate end groups in polar organic solvents,
(c) reacting the resulting adduct in solution with excess quantities of a diamine, based on the isocyanate end groups, and
(d) reacting the polyurethane polyurea adduct thus obtained which contains free amino groups with a substantially equivalent quantity of a dicarboxylic acid dihalide.

Moulding takes place after the reaction is terminated, with simultaneous removal of the solvent.

If in this process an araliphatic diamine is used in step (c), this is made to react in such a way that at first only the aliphatic amino groups undergo reaction.

Dihydroxyl compounds of the formula HO—A—OH introduced into the process, in which A is the bivalent, linear radical of a polyether, polyacetal, polythioether or polyester having molecular weight of from 400 to 4000, can be obtained as follows by known processes:

(a) Polyethers may be obtained by the polycondensation of suitable diols such, for example as hexane diol, methylhexanediol, heptanediol, octanediol, decanediol, xylylene glycol, or bis-hydroxymethyl cyclohexane or hydroxyethylation products of the diols mentioned above. The glycols are used either singly or in mixtures. Furthermore, polyethers may be prepared by polymerisation of suitable monomers such as etyhlene oxide, propylene oxide or tetrahydrofuran.

(b) Polyacetals may be obtained by the reaction of polyhydric alcohols and aliphatic aldehydes such as formaldehyde or paraformaldehyde and hexanediol, methylhexanediol, heptanediol, octanediol, decanediol, xylylene glycol, or bishydroxymethylcyclohexane or hydroxyethylation products of the aforesaid diols. The diols may be used singly or in admixture with each other. In addition, polyethers may also be used for the preparation of polyacetals, for example polyhydroxyethers having a molecular weight if possible below 500, obtained from hexanediol, methylhexanediol, xylylene glycol and bis-hydroxymethylcyclohexane, either singly or as mixtures. Also, polyacetals of the type which have been prepared from hydroxyl polyesters and formaldehyde may be used. The most suitable are hydroxylpolyesters with molecular weights below 500 obtained from dicarboxylic acids such as adipic acid methyladipic acid sebacic acid or, isophthalic acid and diols such as hexanediol, methylhexanediol or β-hydroxyethylether hexanol, optionally with the inclusion of triols.

(c) Polythioethers may be obtained by the polycondensation of suitable thio-compounds such as 2-hydroxyethylmercaptan or 2,2'-dihydroxydiethylsulphide either alone or in admixture with each other or in admixture with hexanediol or 1,4-bis-(2-hydroxy-ethoxy)-butane.

(d) Polyesters may be obtained by the polycondensation of dicarboxylic acids and dialcohols. Examples of suitable dicarboxylic acids are succinic acid, adipic acid, pimelic acid, azelaic acid, sebacic acid, thiodibutyric acid and sulphonyldibutyric acid. The glycols used may, for example, be N-methyldiethanolamine, N-ethyldiisopropanolamine, ethylene glycol, diethylene glycol, propanediol, butanediol, hexanediol, hexahydro-p-xylylene glycol, or 2,2'-dimethyl-propane-1,3-diol and their alkoxylation products. In addition, small quantities of amino alcohols or diamines may be condensed with the polyester so that polyester amides with hydroxyl end groups are obtained. Polyesters prepared on a different basis are the polymerisation products of lactones, especially caprolactone. The hydroxyl end groups may be incorporated by the glycols which are used as initiators.

The softening point of the polyhydroxyl compounds used according to the invention, which have average molecular weights in the region of from 400 to 4000 and particularly from 500 to 2000 should advantageously be below 70° C. Low melting products are particularly advantageous. Polyhydroxyl compounds also within the meaning of this invention include those which have been chain lengthened by reaction with subequivalent quantities of diisocyanates.

The polyurethane adducts according to step (a), which have free isocyanate groups are prepared by reacting the polyhydroxyl compounds, either alone or in admixture with each other, with an excess of polyisocyanate, calculated on the hydroxyl end groups. The OH:NCO ratio is advantageously from 1:1.3 to 1:3.5, preferably from 1:1.5 to 1:2.2. The reaction temperatures are below 150° C., preferably between 65 and 100° C. The reaction time varies from 15 minutes to several hours. The following are mentioned as examples of diisocyanates: 1,6-hexanediisocyanate, 1,4-cyclohexanediisocyanate, 1,4-phenylenediisocyanate, 1,3-phenylenediisocyanate, 2,4-toluylenediisocyanate and 2,6-toluylenediisocyanate and isomeric mixtures thereof, 4,4'-diphenylmethanediisocyanate, 4,4'-diphenyldiisocyanate, 4,4'-o-toluylenediisocyanate, 2,4,6-trialkyl-1,3-phenylenediisocyanate and 3,3'-dimethyl-4,4'-diphenylmethane diisocyanate.

In the reaction with excess quantities of diamines, based on the isocyanate end groups, according to step (c), the production of chain lengthened polyurethane polyurea adducts which have free amino groups, is attained by dissolving the melt in the necessary quantity of solvent for the desired end concentration.

The ratio of free isocyanate end groups of the NCO poly-adduct to the amino groups is generally in the region of from 1:1.1 to 1:5, preferably from 1:1.5 to 1:3. The reaction temperatures are in the region of from —20 to +80° C., especially between —10 and +50° C. The diamine is advantageously added in solution with thorough mixing, but alternatively the dissolved melt may be added to the diamine solution. The reaction times vary between ½ hour and several hours. If according to the preferred embodiment araliphatic diamines are used, the reaction temperatures vary in the region of from —20 to +50° C. according to the reactivity of the aromatic amino group, in order to achieve selective reaction of the aliphatic amino group.

The following aromatic diamines are mentioned as examples of suitable diamines: diaminodiphenylether, 4,4'-diaminodiphenylmethane, 4,4' - diaminodiphenylpropane-(2,2), 1,3-diaminobenzene, 1,4-diaminobenzene, 4,4'-diaminodiphenyl sulphone, benzidine, 4,4'-diaminodiphenylsulphide, 3,3' - diamino-diphenylsulphone, m-xylylenediamine, 2,6-diaminopyridine, 1,5-diaminonaphthalene, 3,3'-dimethyl - 4,4'-diaminodiphenyl, 3,3'-dimethoxybenzidine, 1,5 - di-(p-aminophenoxy)-naphthalene, 2,6-di-(p-aminophenoxy) - naphthalene, 4,4' - di-(p-aminophenoxy)-diphenyl, 4,4'-di-(p-aminophenoxy)-diphenylmethane, 4,4'-di - (p-aminophenoxy) - diphenylpropane-(2,2), 4,4'-di-(p-aminophenoxy)-diphenylether, 1,4-di-(p-aminophenoxy)-benzene, 4,4'-di-(p-aminophenoxy)-diphenylsulphide, 4,4'-di - (p-aminophenoxy)-diphenylpropane-(2,2-, 4,4'-di-(p-chloro-4''-aminophenoxy)-di-phenylpropane-(2,2)- or 1,4-(2'-chloro-4'-aminophenoxy)-benzene.

The following araliphatic diamines, however, are preferred.

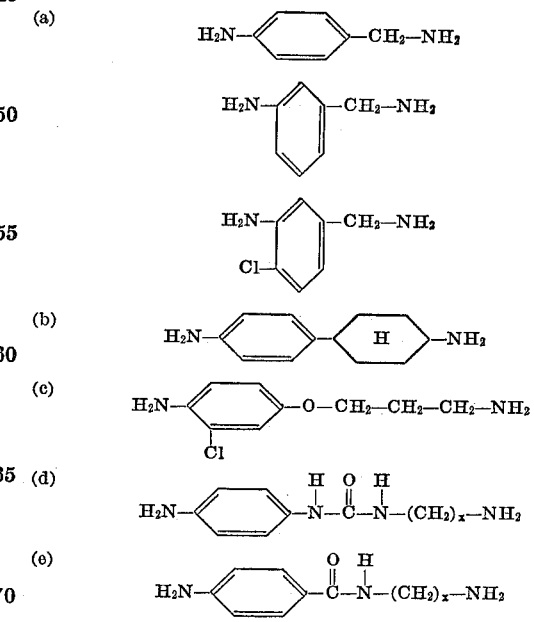

These araliphatic diamines are obtainable by known processes and may be prepared e.g. as follows:

(a) by hydrogenation of optionally substituted nitrobenzonitriles.

(b) by partial hydrogenation in the nucleus of polynuclear aromatic diamines.
(c) by addition of nitrophenols to suitable unsaturated nitriles and hydrogenation.
(d) by addition of aliphatic aminonitriles or aminonitro compounds to nitroarylisocyanates or by addition of nitroarylamines to aliphatic nitroisocyanates and hydrogenation.
(e) by condensation of aliphatic nitro- or cyanoamines with nitroarylcarboxylic acid chlorides and hydrogenation.

Suitable solvents for step (b) are, for example, dimethylformamide, dimethylacetamide, dimethylsulphoxide, tetramethylenesulphone, dimethoxydimethylacetamide, tetramethylurea, N - methylpyrrolidone, chlorobenzene, ethyl acetate, methyl ethyl ketone, methyl-i-propyl-ketone, dioxane or cyclohexanone. It is often advantageous to use mixtures of the above mentioned solvents.

The polyurethane polyurea adducts which contain free amino groups are then according to step (d) polycondensed in solution in the temperature region of from $-20$ to $+80°$ C., preferably between $-10$ and $+30°$ C., with dicarboxylic acid dihalides or mixtures thereof, to which the diamine solution is added either in bulk or in solution, the polycondensation being carried out for reaction times of from one half to several hours.

The quantity of acid dihalide is substantially equivalent to the amino end groups although the chain lengthening may also be carried out with excess or subequivalent quantities in the region of from $\pm 15$ mol percent, whereby the molecular weight of the elastomers can be controlled.

The dicarboxylic acid dihalides used are preferably dicarboxylic acid dichlorides. The following are mentioned as examples: Succinic acid dichloride, adipic acid dichloride, naphthalene dicarboxylic acid chloride-(1,5), diphenyldicarboxylic acid chloride-(4,4'), diphenylsulphone-dicarboxylic acid chloride-(4,4'), diphenylether dicarboxylic acid chloride-(4,4'), isophthalic acid dichloride or terephthalic acid dichloride.

If polar solvents are used, for example dimethylacetamide or N-methylpyrrolidone, it is often unnecessary to add an acid acceptor such as a tertiary amine.

It is also often advantageous to bind the hydrochloric acid chemically by reacting it with alkylene oxides such as ethylene oxide or propylene oxide before the solution is processed to form threads or films. In addition, white or coloured pigments, stabilisers and/or optical brightening agents may be added to the resulting solutions before shaping. The solids content of the solution is generally between 10 to 35%.

The polyurethane elastomers according to the invention are superior to known materials in their resistance to hydrolysis and in their ability to withstand higher thermal stresses. Since the solutions can be kept indefinitely, highly elastic threads can be produced by spinning by the dry or wet spinning process. Furthermore, the solutions can be worked up into foils, films and highly elastic solid bodies. These are obtained by coagulation of the reaction solution. In an additional process, these can then be worked up on rollers, sprayed, calendered or moulded. Elastomers which resemble vulcanised rubber in their properties are obtained by the incorporation of polyisocyanates, peroxides or sulphur. However, their properties are especially advantageous. Owing to their high strength, higher softening points, good fastness to washing, higher moduli, lower fatigue under frequent stretching, resistance to solvents used in chemical dry cleaning, lower permanent elongation and lower wet elongation, elastomer threads are widely used in the textile fields.

The following examples are to further illustrate the invention without limiting it.

EXAMPLE 1

250.0 parts by weight of anhydrous polyesters (OH number=50.4) of adipic acid, hexane-1,6-diol and 2,2-dimethylpropane-1,3-diol in the molar ratio of 8:7:1 are stirred for one hour at 100° C. with exclusion of moisture with 62.5 parts by weight of 4.4'-diphenylmethanediisocyanate. 5.1 parts by weight of N-methyl-diisopropanolamine are then added at 40° C. The melt is kept at this temperature for one hour. It is then dissolved in 756 parts by weight of N,N-dimethylacetamide, the solution is cooled to 25° C., and a solution of 21.4 parts by weight of 4-amino-benzylamine in 150 parts by weight of N,N-dimethylacetamide is added in one portion with vigorous stirring. After one hour's stirring at room temperature, a solution of 18.9 parts by weight of terephthaloyl chloride in 500 parts by weight of N,N-dimethylacetamide is added dropwise at 0° C. with thorough mixing. The highly viscous solution is thereafter stirred for one hour and 12 parts by weight of propylene oxide are added to add on the hydrochloric acid. The 27% solution has a viscosity of 195 poises at 25° C. and when spun by the wet spinning process it yields colourless, highly elastic threads which have the following textile properties:

Titre: 470 dtex.
Tensile strength: 0.58 g./dtex.
Elongation: 480%
Modulus (300%): 166 mg./dtex.
Permanent elongation: 18%
Softening point: 255° C.
Wet elongation: 53%
Light fastness: Note 3–4

EXAMPLE 2

250.0 parts by weight of anhydrous polyester (OH number=50.4) of adipic acid, hexane-1,6-diol and 2,2-dimethylpropane-1,3-diol in the molar ratio 8:7:1 are stirred with 69.8 parts by weight of 4,4'-diphenylmethane diisocyanate for one hour at 100° C. with exclusion of moisture and then cooled to 40° C. 5.1 parts by weight of N-methyl-diisopropanolamine are then added and the reaction mixture is then stirred again at 40° C. for one hour. The melt is dissolved in 814 parts by weight of N,N-dimethylacetamide, the solution is cooled to 20° C., and a solution of 34.1 parts by weight of tetrahydro-1,5-naphthylenediamine in 150 parts by weight of N,N-dimethylacetamide is added in one portion with vigorous stirring. The temperature is maintained at 20° C. for 2 hours and a solution of 20.1 parts by weight of terephthaloyl chloride in 50 parts by weight of N,N-dimethylacetamide is then slowly added dropwise at this temperature. The viscous solution is stirred for another 5 hours at room temperature. 15 parts by weight of propylene oxide are then stirred in to neutralise the hydrochloric acid. The solution has a viscosity of 115 poises at 25° C. The colourless solution is spun by the wet spinning process to produce threads which have the following properties:

Titre: 460 dtex.
Tensile strength: 0.49 g./dtex.
Elongation: 380%
Modulus (300%): 303 mg./dtex.
Permanent elongation: 28%
Softening point: >260° C.
Wet elongation: 72%
Light fastness: Note 3

EXAMPLE 3

206.0 parts by weight of polytetrahydrofuran (OH number=108) are dehydrated for 2 hours at 100° C./15 mm. Hg, 70.0 parts by weight of 4,4'-diphenylmethanediisocyanate are added with stirring and with the exclusion of moisture, and the mixture is stirred for one hour at 100° C. The melt is then dissolved in 658 parts by weight of N,N-dimethylacetamide, cooled to 25° C., and then combined in one portion with a solution of 23.9 parts by weight of (γ-aminopropyl)-(p-aminophenyl) ether in 150 parts by weight of N,N-dimethylacetamide with vigorous mixing. The reaction mixture is stirred for 2 hours at 25° C. and a solution of 13.0 parts by weight of terephthaloyl chloride in 50 parts by weight of N,N-dimethylacetamide is then added dropwise at 0° C. The reaction mixture is then stirred for another 2 hours at room temperature. 15 parts by weight of propylene oxide are stirred in to add on the hydrochloric acid. The 27% solution has a viscosity of 310 poises at 25° C. The wet spun, colourless, highly elastic threads have the following textile properties:

Titre: 560 dtex.
Tensile strength: 0.57 g./dtex.
Elongation: 570%
Modulus (300%): 278 mg./dtex.
Permanent elongation: 23%
Softening point: 240° C.
Wet elongation: 60%
Light fastness: Note 3

EXAMPLE 4

250 parts by weight of a polyester (OH number 55.2) of adipic acid, hexane-1,6-diol and 2,2-dimethylpropane-1,3-diol in the molar ratio 8:7:1 are melted at 100° C. and 46.1 parts by weight of 4,4'-diphenylmethanediisocyanate are added with stirring. The melt is kept at 100° C. for one hour and then dissolved in 501 parts by weight of dimethylacetamide and cooled to 25° C., and a solution of 25.0 parts by weight of 4,4'-diaminodiphenylmethane in 400 parts by weight of dimethylacetamide is then added with vigorous mixing. After one hour's stirring at room temperature, a solution of 12.7 parts by weight of terephthalolyl chloride in 100 parts by weight of dimethylacetamide is added dropwise to the reaction solution with thorough mixing at room temperature. The highly viscous solution is then stirred for one hour and 10 parts by weight of propylene oxide are added to add on the hydrochloric acid. The 25% solution has a viscosity of 115 poises at 25° C. and colourless, highly elastic threads which have the following textile properties are obtained from it by wet spinning:

Titre: 480 den.
Tensile strength: 0.44 g./den.
Elongation: 430%
Modulus (300%): 0.149 g./den.
Permanent elongation: 16%
Softening point: 250° C.
Wet elongation: 57%

EXAMPLE 5

250 parts by weight of anhydrous polyester (OH number 55.2) of adipic acid, hexanediol-1,6 and 2,2-dimethylpropanediol-1,3 in the molar ratio of 8:7:1 are stirred together with 52.3 parts by weight of 4,4'-diphenylmethane diisocyanate for 1 hour at 100° C. with exclusion of moisture and then dissolved in 541 parts by weight of dimethyl acetamide. The clear solution is then cooled to 25° C. A solution of 30.7 parts by weight of 4,4'-diaminodiphenyl methane in 400 parts by weight of dimethylacetamide is added in one portion with vigorous stirring. Stirring is then continued for 30 minutes at room temperature and a solution of 14.7 parts by weight of terephthaloyl chloride in 100 parts by weight of dimethylacetamide is then slowly introduced dropwise at room temperature without cooling while the reaction mixture is stirred. After a further two hours stirring at this temperature, the hydrochloric acid is added on by adding 15 parts by weight of propylene oxide to the solution which has a viscosity of 38 poises at 25° C. The colourless, highly elastic threads obtained by wet spinning have the following textile properties:

Titre: 425 den.
Tensile strength: 0.42 g./den.
Elongation: 475%
Modulus (300%): 0.126 g./den.
Permanent elongation: 20%
Softening point: >260° C.
Wet elongation: 60%

EXAMPLE 6

255 parts by weight of polytetrahydrofuran (OH number 55) are dehydrated for one hour at 100° C./15 mm. Hg and reacted with 53.1 parts by weight of 4,4'-diphenylmethane diisocyanate for 45 minutes at 110° C. with stirring and with exclusion of moisture. The melt is dissolved in 561 parts by weight of dimethylacetamide and cooled to 25° C. and a solution of 31.4 parts by weight of 4,4'-diaminodiphenylmethane in 400 parts by weight of dimethylacetamide is added with vigorous stirring and the reaction mixture is stirred at room temperature for 1.25 hours. A solution of 14.2 parts by weight of terephthaloyl chloride in 100 parts by weight of dimethylacetamide is then added dropwise with stirring at room temperature without cooling. After one hour's stirring, 10 parts by weight of propylene oxide are added. The 25% solution has a viscosity of 170 poises at 25° C. The solution is wet spun and the threads have the following properties:

Titre: 390 den.
Tensile strength: 0.5 g./den.
Elongation: 410%
Modulus (300%): 0.246 g./den.
Permanent elongation: 21%
Softening point: 260° C.
Wet elongation: 49%

EXAMPLE 7

255 parts by weight of polytetrahydrofuran (OH number 55) are dehydrated for one hour at 100° C./15 mm. Hg, 46.9 parts by weight of 4,4'-diphenylmethanediisocyanate are added with stirring and the reaction mixture is stirred for one hour at 100° C. The melt is then dissolved in 594 parts by weight of dimethylacetamide and cooled to 25° C., and the solution of 37.4 parts by weight of 4,4'-diaminodiphenylmethane in 400 parts by weight of dimethylacetamide is added with vigorous mixing.

A solution of 25.6 parts by weight of terephthaloyl chloride in 100 parts by weight of dimethylacetamide is then added dropwise with stirring after one hour's stirring at room temperature, the reaction mixture is then stirred for ½ hour at room temperature, and 20 parts by weight of ethylene oxide are introduced to add on the hydrochloric acid. The 25% solution has a viscosity of 89 poises at 25° C. The wet spun, highly elastic, colourless threads are found to have the following textile properties:

Titre: 530 den.
Tensile strength: 0.4 g./den.
Elongation: 520%
Modulus (300%): 0.139 g./den.
Permanent elongation: 22%
Softening point: >260° C.
Wet elongation: 53%

EXAMPLE 8

255.0 parts by weight of polytetrahydrofuran (OH number 55) are dehydrated for one hour at 100° C./15 mm. Hg and after the addition of 32.6 parts by weight of toluylene diisocyanate (2,4- and 2,6-isomeric mixture), the mixture is stirred for 30 minutes at 110° C. The melt is then dissolved in 547 parts by weight of N-methylpyrrolidone and cooled to 20° C., and a solution of 55.2 parts by weight of 1,4-bis-(p-aminophenoxy)-benzene in 400 parts by weight of N-methylpyrrolidone is added with stirring. The reaction mixture is stirred for 30 minutes at room temperature and 30.0 parts by weight of triethylamine are added. A solution of 32.1 parts by weight of adipic acid dichloride in 100 parts by weight of dioxane is then added dropwise, the mixture is stirred at room temperature for one hour, and 20.0 parts by weight of propylene oxide are added. The 25% solution has a viscosity of 60.3 poises at 25° C.

A foil obtained by casting the solution to form a 0.8 mm. thick layer and removing the solvent by evaporation is found to have the following properties:

Thickness: 0.18 mm.
Tensile strength: 259 kg./cm.²
Elongation: 520%
Strength (300% elongation): 126 kg./cm.²
Tear propagation resistance according to Graves: 31.5 kg./cm.²
Micro hardness: 48

EXAMPLE 9

206.0 parts by weight of polytetrahydrofurane (OH number 108), dehydrated at 100° C./14 torr, are reacted with 65.0 parts by weight of 4,4'-diphenylmethane diisocyanate for 1 hour at 100° C. The melt thus obtained is dissolved in 604 parts by weight of N,N-dimethylacetamide; after cooling to 25° C. a solution of 18.2 parts by weight of hexahydrobenzidine in 150 parts by weight of N,N-dimethylacetamide is added to this solution. After stirring for 2 hours at 25° C. the solution thus obtained is cooled to 0° C. and a solution of 7.3 parts by weight of isophthalic acid in 50 parts by weight of N,N-dimethylacetamide is added dropwise. Stirring is continued at room temperature for 3 hours and 12 parts by weight of propylene oxide are added in order to chemically bind the hydrochloric acid. The viscosity of the 27% solution is 240 poises at 25° C. The solution is wet-spun and highly elastic colorless filaments are obtained having the following textile properties:

Titre: 500 dtex.
Tensile strength: 0.46 g./dtex.
Elongation: 430%
Modulus (300%): 135 mg./dtex.
Permanent elongation: 27%
Softening point: 235° C.
Light fastness: Note 3
Wet elongation: 53%

What we claim is:

1. Polyurethane elastomers consisting essentially of the recurrent structural segment of the formula:

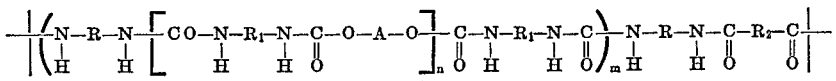

in which

A is a bivalent long chained linear radical consisting essentially of recurrent ether, acetal, thioether or ester groups and having an average molecular weight in the region of from 400 to 4000, R is a radical selected from the group consisting of phenylene, diphenylene, naphthylene and radicals of the formula:

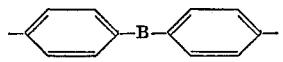

in which B is a radical consisting of —O—, —S—, —SO₂—, —CO—, alkylene, and radicals of the formula —AR—X—Y— in which Ar is a radical selected from the group consisting of phenylene, diphenylene, and naphthylene, X is a member selected from the group consisting of a single bond, an ether, a carbonyl, an amide group and urea group and Y is a straight chained or branched alkylene radical having from 1 to 20 carbon atoms, R₁ is a member selected from the group consisting of alkylene, cyclohexylene, aralkylene, alkarylene, phenylene, diphenylene, naphthylene and a radical of the formula

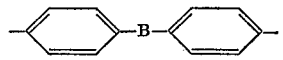

in which B has the meaning indicated above,

R₂ is a member selected from the group consisting of
 (I) bivalent aliphatic radicals having from 1 to 12 carbon atoms and
 (II) bivalent aromatic radicals consisting of one or more aromatic nuclei which may be condensed or connected via alkylene, oxygen, sulphonyl or carbonyl bridges, and n and m are integers of 1 or more.

2. Elastic threads or fibers consisting essentially of polyurethane elastomers having the recurrent structural segments of the formula

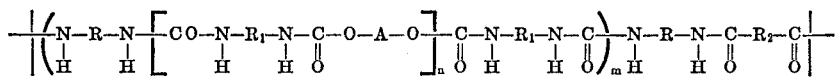

in which R, R₁, R₂, A, m and n have the meaning indicated in claim 1.

3. Polyurethane elastomers according to claim 1 consisting essentially of recurrent structural elements of the formula:

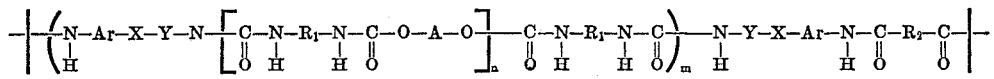

in which

Ar is a phenylene, diphenylene or naphthylene radical,
X is a member selected from the group consisting of a single bond, an ether, carbonyl, amide and urea group,
Y is a straight chained or branched alkylene radical having from 1 to 20 carbon atoms, and
R₁, R₂, A, m and n have the meaning indicated in claim 1.

4. The process of claim 2, wherein said diamine of step (c) is an araliphatic diamine.

5. The process of claim 2, wherein said solvent of step (b) is dimethylacetamide.

6. The process of claim 2, wherein said dicarboxylic acid halide of step (d) is terephthaloyl chloride.

7. A process for the production of polyurethane elastomers, which comprises (a) reacting a dihydroxyl compound having a molecular weight in the region of from 400 to 4000, selected from the group consisting of polyether, polyacetal, polythioether and polyester with a stoichiometric excess of a difunctional organic isocyanate, based on the hydroxyl end groups, said reacting being carried out in the melt at temperatures of up to +150° C., (b) dissolving the resulting adduct which has isocyanate end groups in inert polar organic solvents, (c) reacting the resulting adduct in solution with excess quantities of a diamine, based on the isocyanate end groups, and (d) reacting the polyurethane polyurea adduct thus obtained, which contains free amino groups with a substantially equivalent quantity of a dicarboxylic acid dihalide.

8. The process of claim 7 wherein step (c) is conducted at a temperature of −20 to +80° C.

9. The process of claim 7 wherein step (d) is conducted at a temperature of −20 to +80° C.

10. A process for the production of polyurethane elastomers which comprises
(a) reacting a dihydroxyl compound having a molecular weight in the region of from 400 to 4000 selected from the group consisting of a polyether, polyacetal, polythioether and polyester with a difunctional organic isocyanate, said reacting being carried out in the melt at temperatures of +65 to +100° C. wherein the ratio of hydroxyl groups on the dihydroxy compound to NCO groups on the isocyanate is from 1:1.3 to 1:3.5 to form a first adduct,
(b) dissolving the first adduct in a polar organic solvent to form a solution of the first adduct,
(c) reacting at −10 to +50° C. the first adduct in solution with an araliphatic diamine wherein the ratio of NCO groups on the first adduct to amino groups on the diamine is from 1:1.1 to 1:5 to form a second adduct,
(d) reacting at −10 to +30° C. the second adduct with a substantially equivalent quantity of a dicarboxylic acid dihalide to form the polyurethane elastomer.

References Cited

UNITED STATES PATENTS 3,475,377  10/1969  Rosendahl et al. _____ 260—75

WILLIAM H. SHORT, Primary Examiner

L. L. LEE, Assistant Examiner

U.S. Cl. X.R.

260—32.6 N, 47 CZ, 75 NH, 775 R, 775 AM, 775 SP

UNITED STATES PATENT OFFICE
CERTIFICATE OF CORRECTION

Patent No. 3,682,861        Dated August 8, 1972

Inventor(s) Eduard Redlmann et al

It is certified that error appears in the above-identified patent and that said Letters Patent are hereby corrected as shown below:

Column 4, line 41, "diphenylpropane-(2,2-" should read ---diphenyl sulphone---.

Column 4, line 41, "-p-" should read --(2"--.

Column 6, line 6, "4.4'" should read ---4,4'---.

Signed and sealed this 19th day of November 1974.

(SEAL)
Attest:

McCOY M. GIBSON JR.
Attesting Officer

C. MARSHALL DANN
Commissioner of Patents